United States Patent Office 3,823,079
Patented July 9, 1974

3,823,079
ALUMINUM REDUCTION CELL
OPERATING SYSTEM
Leland Stanford Beeler, Richmond, Va., assignor to
Reynolds International, Inc., Richmond, Va.
No Drawing. Filed Dec. 14, 1972, Ser. No. 315,276
Int. Cl. C22d 3/12
U.S. Cl. 204—67             12 Claims

ABSTRACT OF THE DISCLOSURE

In the operation of an aluminum reduction cell, to recover fluorine values in a dry system, the cell effluent gas containing hydrogen fluoride and other fluorine values is continuously withdrawn from the cell, and contacted with alumina, preferably that type of alumina which has been calcined at between about 975° C. and about 1150° C., whereby the alumina is fluoridated, and recovered for recycling to the reduction cell operation. The alumina may have advantageously incorporated therewith from about 1% to about 10% by weight of dry sodium carbonate for improved fluorine pick-up and retention, in which case even more highly calcined alumina may be utilized.

BACKGROUND OF THE INVENTION

The present invention concerns a method of operating an aluminum reduction cell whereby the cell effluent gases are treated in a dry system for the recovery of fluorine values.

Aluminum metal is conventionally produced in electrolytic reduction cells by passing an electric current through a bath of molten cryolite containing dissolved alumina and other additives such as fluorspar, magnesium fluoride, and the like. The carbon lining of the cell and the pool of molten metallic aluminum overlying it when the cell is in operation constitute the cathode. The anode may be either prebaked carbon having a metallic conductor embedded therein, or it may be formed in situ from a plastic mixture of carbon and a pitch binder continuously fed downward into the interior of the cell, the most widely used anode of this type being the Soderberg electrode.

During cell operation the temperature of the molten electrolyte is usually in the vicinity of about 900° to 1000° C., or well above the melting point of aluminum which is 660° C. As the anode carbon is consumed, conversion of the carbon to carbon dioxide and some carbon monoxide takes place. At the same time, significant amounts of hydrogen fluoride are generated. These gases, together with entrained fine particles of other effluent materials such as alumina, cryolite, carbon dust, calcium fluoride, aluminum fluoride, magnesium fluoride, complex iron fluorides and other metal fluorides in trace amounts, sulfur, gaseous hydro-carbons, hydrogen, water vapor and tars, compose the cell effluent or waste gases.

The present invention relates to collecting and treating cell effluent gas, particularly as regards the recovery and reuse of fluorine components.

BRIEF SUMMARY OF THE INVENTION

In accordance with the present invention, an aluminum reduction cell is operated in such manner that cell effluent gas, containing hydrogen fluoride and other gases and particulate material, is collected and then treated in a dry scrubbing system such as a fluidized bed of alumina. There may be incorporated with the alumina from about 1% to about 10% by weight of sodium carbonate. The hydrogen fluoride is either adsorbed by or combined chemically with the alumina to form aluminum fluoride. The ability of this system to retain fluorine is enhanced by the presence of sodium carbonate, which in turn forms either sodium fluoride or, in combination with the aluminum fluoride formed, provides the components of cryolite. For the most effective operation of the process, the alumina is calcined to provide special characteristics described more fully below. The treated effluent gas, which may still contain various non-condensible materials and non-reactants, is passed through a suitable dust collecting system and then vented to the amosphere. The fluoridated alumina thus obtained may be recycled to the reduction cell, thus serving to replace loss of fluorine values incurred in normal cell operation.

It is known that the ability of alumina (or alumina hydrate) to either chemically react with, adsorb or absorb hydrogen fluoride depends on several inter-related factors among which are the degree of hydration, the degree of calcination, the surface area and the crystalline form of the alumina. In the normal operation of the Bayer process the alumina values are usually precipitated from a sodium aluminate solution in the hydrated form known as alpha trihydrate. When alpha trihydrate is gradually heated in a conventional rotary or fluidized kiln to a temperature about 1200° C. it is converted into alpha alumina. As the alpha trihydrate is being calcined it undergoes several transformations such as changes in chemically combined water content, surface area and crystalline form, which influence its ability to react chemically, and its ability to adsorb or absorb liquids or gases. Some authorities claim the alpha trihydrate loses two moles of chemically combined water and is thereby transformed into alpha monohydrate, then gradually loses another one-half mole of water as it is transformed into $Al_2O_3 \cdot \frac{1}{2} H_2O$, and finally loses the rest of its chemically combined water. Various names have been given to the transitional phases developed during calcining, but most authorities agree that the initial material is alpha trihydrate and that the ultimate form is alpha alumina. For present purposes, all phases between alpha trihydrate and alpha alumina are designated as transitional phases of alumina.

It is further known that the maximum rate and degree of fluoridation when hydrogen fluoride is brought into contact with alumina occurs when transitional phases are present, and more specifically when the alumina is at or near the phase corresponding to $Al_2O_3 \cdot \frac{1}{2} H_2O$. It is also known that the minimum rate and degree of fluoridation occurs when the hydrogen fluoride is brought into contact with alpha alumina. The degree of reactivity decreases from its peak at the near $Al_2O_3 \cdot \frac{1}{2} H_2O$ phase to the minimum at the alpha alumina stage.

Thus, alumina calcined at about 900° C., which contains a mixture of the above described transitional aluminas, has been proposed in the prior art as a re-agent for removal of fluorine values from cell waste gases, because it is able to combine with HF more readily than highly calcined types of alumina. It has the disadvantage, however, due to its chemically combined water and, more particularly, its ability to adsorb or absorb water from the ambient air, that when fluoridated and then recycled to a reduction cell, water is released at the high cell temperature, leading to decomposition of the cell electrolyte and liberation of hydrogen fluoride. The release of hydrogen fluoride in this manner is self-defeating, since the objective is to recover and re-use previously released HF which has found its way into the effluent gas.

A more highly calcined alumina, e.g., calcined at a temperature of 1175° or higher, is substantially anhydrous, but it is predominantly in a crystalline form corresponding to alpha type alumina. The alpha type is capable of absorbing only a very small amount of HF and this is released when the fluoridated alpha type alumina is introduced into the reduction cell, again defeating the object of utilizing the HF in the reduction process.

DETAILED DESCRIPTION OF THE INVENTION

In accordance with the present invention, it has been found that the drawbacks of using either the lower calcination temperature transitional aluminas or a higher calcined alpha type alumina for recovery of hydrogen fluoride from cell effluent gas can be overcome by employing as the recovery agent an alumina which has been calcined at between about 975° C. and about 1150° C., typically at about 1050° C. This type of calcined alumina is readily available and can be produced by control of the rotary or fluidized kilns in the conventional Bayer alumina plant. It does not possess all the excess water present in, or water adsorption or absorption capacity of, the type of alumina which has been calcined at lower temperatures, such as the 900° C. calcined alumina, previously mentioned, and at the same time it is not predominantly alpha alumina which would otherwise make it tend to absorb only a small quantity of hydrogen fluoride. This selectively calcined alumina will ordinarily be capable of picking up about 1.5% of its weight of hydrogen fluoride, calculated as fluorine, which appears predominantly in the form of aluminum fluoride in the fluoridated product.

In accordance with a further aspect of the invention, it has been found that the fluorine recovery ability of a system utilizing calcined alumina is enhanced by incorporating with the alumina between about 1% and about 10%, preferably between about 1% and about 5%, by weight, of sodium carbonate. Thus, by including 5% $Na_2CO_3$, the fluorine pick-up of the alumina scrubbing system is approximately doubled and a smaller quantity of alumina is required. It is believed that using sodium carbonate in the system makes it possible to recover and retain more effectively that part of the hydrogen fluoride which does not react with the alumina to form aluminum fluoride, including fluorine which may have been absorbed or adsorbed by the alumina, and which otherwise would be released when exposed to the high temperature reduction cell. Although alumina calcined in the range of 975° C. to 1150° C. is preferred, even more highly calcined alumina can be used with an addition of sodium carbonate, which makes possible better pick-up and retention of HF than would otherwise be possible. Similarly, any HF which is not picked up by the alumina, whatever form of alumina is employed, can be scavenged by contacting the effluent gas with sodium carbonate in a succeeding stage.

The particle size range of the alumina employed in the practice of the invention is not critical and run-of-mill kiln material approximating metallurgical grade alumina may be employed which, for example, is typically in the range of about 200 to 325 mesh.

The contact between the effluent gas and the alumina, with or without the sodium carbonate, may be carried out in any suitable type of treatment unit, utilizing a stationary bed or a wall of powdered alumina, but it is preferably performed in a unit in which the alumina is present in fluidized form, the effluent gas servering as a fluidizing agent. The alumina, sodium carbonate, or alumina sodium carbonate mixture may be simply discharged into the stream of effluent gas at a point where the gas has sufficient velocity to keep the solids suspended for a time sufficient to accomplish fluoridation, after which the velocity is allowed to decrease so as to effect a separation of the bulk of fluoridated solids from the treated effluent gas. A more sophisticated unit suitable for fluidized bed processing comprises a hollow tubular shaft having a perforated plate in its lower portion above which the fluidized bed is maintained and into which two gas streams are injected, one of which is the effluent gas, and the other a stream of heating gas, if necessary. The alumina is introduced into the lower portion of the shaft at a point between the two gas inlets. The resulting fluoridated solids are continuously removed from the bottom of the shaft. A cyclone is provided to recover fines carried off by the treated gas stream, which also results in recovering particulates and untreated solids. Additional cyclones can be used for more effective cleaning of the gas. As indicated previously, a similar back-up unit can be included for separate treatment with sodium carbonate in order to assure complete removal of HF.

The process of the invention thus comprises a novel method of aluminum reduction cell operation to recover and re-use fluorine values in a dry system, in which the effluent gas of a reduction cell, having a gas collecting shroud or hood, is withdrawn by means of a suction fan, being typically diluted with from 5 to 20 volumes of ambient air during its recovery, and conveyed to a treatment unit of the character described. This gas containing fluorine values is contacted with alumina, preferably a fluidized bed of alumina which has been calcined at about 975° C. to 1150° C., and with which there may be incorporated from about 1% to about 10% by weight of sodium carbonate, the treatment being continued for a period of time sufficient to fluoridate the alumina or alumina-sodium carbonate combination, and the effluent gas being advantageously employed as a fluidizing agent. The resulting fluoridated solids, which may include sodium fluoride, are recovered and may be recycled to an aluminum reduction cell. The treated effluent gas, which usually still contains non-condensibles or non-reactants, is passed to a dust removal (cyclone or bag) system, and the gas after removal of the particulates is vented to the atmosphere. The term "fluoridated" means absorbed, adsorbed, or chemically combined fluorine.

DESCRIPTION OF THE PREFERRED EMBODIMENTS

The following examples illustrate the practice of the invention but are not to be considered as limiting:

Example 1

Cell effluent gas was collected at a flow rate of about 2000 cubic feet per minute from a group of alumina reduction cells in full operation, having the following typical analysis:

| | |
|---|---|
| Nitrogen | 78% (by volume). |
| Oxygen | 21%. |
| Carbon monoxide | less than 400 p.p.m. |
| Carbon dioxide | less than 600 p.p.m. |
| Total fluorides | 80 p.p.m. |
| Aluminas | .02 grains. |
| Carbon | .02 grains. | and therefore diluted with about seven times its volume of ambient air.

The cooled gas was contacted with a bed of alumina which had been calcined at 1150° C., containing about 50% alpha alumina, the gas serving to maintain the alumina in fluidized condition, at about 200° to 250° F. The alumina recovered from the treatment unit contained 1.51% by weight of fluorine.

The recovered alumina showed a loss on ignition at 1000° C. of 0.26%. Particle size analysis showed 12% +200 mesh, 42% +325 mesh, and 58% −325 mesh.

When calcined at 900°% C. it still retained 0.63% F.

Example 2

Proceeding as in Example 1, there was employed in the fluidized bed the same calcined alumina having admixed therewith 1.06% by weight of dry sodium carbonate. The fluoridated solids recovered had a fluorine content of about 2% by weight.

Example 3

Proceeding as in Example 2, there was employed alumina admixed with 4.8% dry $Na_2CO_3$. The fluorine content of the recovered treating materials was 2.4%.

Example 4

The extent to which the addition of sodium carbonate improves the fluorine recovery operation is shown by a series of tests using alumina calcined at 1150° C., of the type described in Example 1, and gas treated, which had picked up 1.51% fluorine by weight. When this fluoridated alumina was heated at 300°, 500°, and 900° C. the fluorine content decreased to 1.44%, 1.29%, and 0.63% respectively.

When the alumina containing the 1.51% fluorine was heated with 1.06% by weight of dry sodium carbonate at the same set of temperatures, the residual fluorine content was 1.26%, 1.43%, and 0.81% respectively.

When the alumina containing 1.51% F was admixed with 4.80% $Na_2CO_3$ and heated at the same set of temperatures, the residual F was 1.36%, 1.48%, and 1.27%.

These tests clearly demonstrate the ability of the sodium carbonate to improve the retention of fluorine and the corresponding benefits to be obtained in this regard when an alumina containing the $Na_2CO_3$ is used for effluent gas treatment.

What is claimed is:

1. Process for the operation of an aluminum reduction cell to recover and re-use fluorine values in a dry system, comprising the steps of:
   (a) withdrawing effluent gas containing fluorine values given off during cell operation;
   (b) contacting the gas obtained in step (a) with alumina prepared by calcining Bayer process alumina hydrate at between 975% C. and about 1150° C. for a period of time sufficient to obtain calcined alumina capable of picking up about 1.5% of its weight of HF, calculated as fluorine, and having an alpha alumina content up to about 50%, said contacting being effective to fluoridate the calcined alumina;
   (c) recovering the fluoridated alumina; and
   (d) recycling the recovered fluoridated alumina as feed for a reduction cell.

2. The process of Claim 1 in which the calcined alumina has incorporated therewith between about 1% and about 10% by weight of dry sodium carbonate.

3. The process of Claim 1 in which the alumina is in the form of a fluidized bed.

4. The process of Claim 3 in which said fluidized bed is maintained by a stream of said effluent gas.

5. The process of Claim 9 in which alpha-type alumina is employed in admixture with the sodium carbonate.

6. The process of Claim 1 in which the alumina particle size is predominantly in the range of 200 to 325 mesh.

7. The process of Claim 1 which includes initially contacting the effluent gas with the calcined alumina at a gas temperature of about 200° to 250° F.

8. The process of Claim 1 in which the effluent gas is intimately mixed with dry sodium carbonate just prior to venting the treated gas to atmosphere.

9. In a dry system for treating the effluent gas of an aluminum reduction cell to recover fluorine values given off during cell operation, the process which comprises:
   (a) contacting the effluent gas with a mixture of alumina and dry sodium carbonate effective to extract fluorine from the gas, thereby obtaining fluoridated solids suitable for recycling to the cell; and
   (b) recovering the fluoridated solids.

10. In a dry system for treating the effluent gas of an aluminum reduction cell with alumina to extract fluorine values given off during operation of the cell, the process which comprises contacting said gas with the alumina and with dry sodium carbonate in successive stages.

11. The process of claim 9 in which said mixture comprises alumina prepared by calcining Bayer process alumina hydrate at between about 975° C. and about 1150° C.

12. The process of Claim 10 in which said gas is contacted with alumina prepared by calcining Bayer process alumina hydrate at between about 975° C. and about 1150° C.

References Cited
UNITED STATES PATENTS

| | | | |
|---|---|---|---|
| 3,470,075 | 9/1969 | Johnson | 204—67 |
| 3,457,150 | 7/1969 | Vancil et al. | 204—67 |
| 3,533,924 | 10/1970 | Ve | 204—67 |

J. H. MACK, Primary Examiner

D. R. VALENTINE, Assistant Examiner